(12) United States Patent
Vismara et al.

(10) Patent No.: US 6,824,202 B2
(45) Date of Patent: Nov. 30, 2004

(54) BONNET STRUCTURE FOR AUTOMOBILES WITH IMPROVED SAFETY CHARACTERISTICS

(75) Inventors: Mario Vismara, Casatenovo (IT); Jean Louis Toneatti, Besana Brianza (IT)

(73) Assignee: Adlev S.R.L., Monza-Milan (IT)

(*) Notice: Subject to any disclaimer, the term of this patent is extended or adjusted under 35 U.S.C. 154(b) by 0 days.

(21) Appl. No.: 10/436,954

(22) Filed: May 13, 2003

(65) Prior Publication Data

US 2003/0214151 A1 Nov. 20, 2003

(30) Foreign Application Priority Data

May 16, 2002 (IT) ..................................... MI2002A1042

(51) Int. Cl.[7] .............................................. B60R 27/00

(52) U.S. Cl. ........................... 296/193.11; 296/187.09; 180/69.2

(58) Field of Search ............................ 296/76, 187.04, 296/187.02, 187.09, 193.11; 180/69.2, 69.21

(56) References Cited

U.S. PATENT DOCUMENTS

| 4,378,395 | A | * | 3/1983 | Asoshina et al. | ...... 296/187.02 |
| 4,451,518 | A | * | 5/1984 | Miura et al. | ............ 296/187.02 |
| 4,598,008 | A | * | 7/1986 | Vogt et al. | ............. 296/187.02 |
| 6,048,022 | A | * | 4/2000 | Ishibashi et al. | ....... 296/187.09 |

* cited by examiner

*Primary Examiner*—Lori L. Coletta
(74) *Attorney, Agent, or Firm*—Hedman & Costigan, P.C.

(57) ABSTRACT

A bonnet structure for automobiles with improved safety characteristics, in particular in the case of collisions in road accidents between automobiles and pedestrians, comprising at least one absorbency element (14), made for example from expanded polypropylene, expanded polyurethane or in a honey comb, placed between the outer surface (10) and the lower or inner surface (11) of the bonnet; the absorbency element (14) can be fixed through gluing or other mechanical connection means and, moreover, it is possible to foresee placing a material (16) with strong resistance to traction and with zero or almost zero bending moment on at least one of the sides of the absorbency element (14), in order to connect the outer and inner surfaces (10, 11) of the bonnet more firmly and to improve local resistance to breaking of the absorbency element (14).

11 Claims, 5 Drawing Sheets

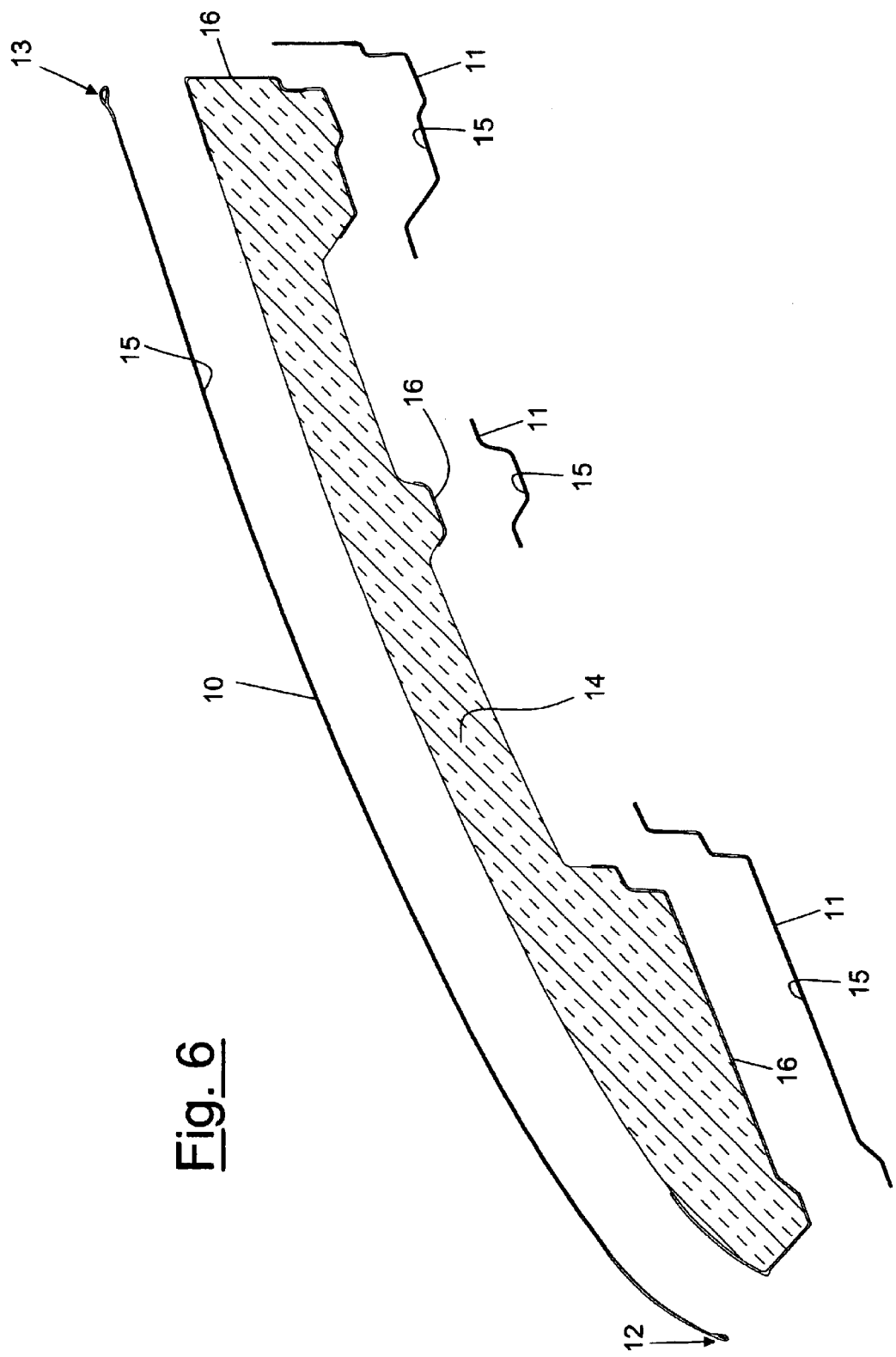

BONNET STRUCTURE FOR AUTOMOBILES WITH IMPROVED SAFETY CHARACTERISTICS

The present invention refers to a bonnet structure for automobiles with improved safety characteristics, in particular in the case of collisions between vehicle and pedestrian due to road accidents.

The bonnet which encloses the motor space of automobiles and other cars is usually realised by means of a bent plate, which defines an outer or upper surface, coupled with a shaped plate, which constitutes the inner or lower surface.

The lower plate is suitably realised so as both to allow the housing inside the motor space of all the apparatuses foreseen for the model of automobile being considered, and to avoid weighing down the entire structure too much, in order to keep good aerodynamic characteristics of the vehicle.

Moreover, conventional bonnet structures to this day constitute a serious source of danger to the safety of pedestrians in the case of collisions in road accidents between vehicles and pedestrians.

Regarding this, the European Community, in accordance with the main automobile manufacturers, has decided to issue a timetable for the introduction of new homogenising laws regarding automobiles, which shall have the purpose of reducing the seriousness of the injuries suffered by pedestrians during road accidents which take place with automobiles.

All of this in order to reduce the substantial cost borne by the Community deriving from the extremely high number of serious injuries to pedestrians, due to the aforementioned road accidents, taking into account the long periods in hospital to give the injured the necessary care.

Although such guidelines are not yet homogenised, a large number of governing institutions, European and private, which have the purpose of checking the "quality" of automobiles as far as the safety of occupants of the vehicle and of third parties is concerned, in the case of road accidents, have already decided to carry out tests regarding this on automobiles currently produced and, moreover, in certain cases to provide public evaluations on the results of such tests.

For example, this is the case of Renault, which, concerning the "Laguna" model, has recently advertised recognition received ("five stars") from a private body concerned with the evaluation of the requirements asked on the subject of passenger safety. The sixth star, which on the other hand concerns passing the passenger collision test, was not obtained.

The tests relative to a collision between automobile and pedestrian involve three different body parts of the pedestrian, and specifically the leg, the thorax and the head. Moreover, for each automobile an area of impact for each of the aforementioned parts of the pedestrian is defined.

In particular, for a collision which involves the area corresponding to the head of the pedestrian ("head collision") a substantially large area of the bonnet of the automobile is usually involved.

To be specific, "head collision" is defined, according to the current guidelines, as the impact of a mock-up head (consisting of a sphere at least partially made from aluminium and comprising a spherical cover made from rubber which is about 25 mm thick) on the outer surface of the bonnet, according to a predetermined angular direction with respect to the ground.

The guidelines and regulations currently in force determine adaptability criteria, according to which the outer or upper surface of the bonnet of an automobile must be realised in such a way as not to cause serious injury to the pedestrian, in the case of a collision, taking into account determined values of weight, speed and angle of impact of the aforementioned mock-up head on the bonnet. Therefore, for example, the European Authority has issued directives ("ACEA" phase 1 and "ACEA" phase 2), based upon which the bonnet structure of an automobile must not cause harm to pedestrians for low weight values of the head, of 3.5 kg and 4 kg, and speed of impact values of 35 km/h and 40 km/h, with an angular direction of collision, with respect to the horizontal direction of the ground, of between 40° and 60°.

In greater detail, the test is conducted by hurling the mock-up head on the outer surface of the bonnet, according to a predetermined angular direction, as stated previously, of between 40° and 60°, with respect to the ground and by detecting the resulting acceleration (acceleration vector rule).

From such an acceleration value a determined function, known as HPC, is then calculated, according to the formula $$HPC = \left(1/(t_2 - t_1) \cdot \int_{t_1}^{t_2} a \, dt \right)^{2,5} \cdot (t_2 - t_1),$$

where $|t_2 - t_1| \leq 15$ ms, with the acceleration expressed in values referred to as $g = 9.8$ m/s$^2$ and time t in seconds.

From this the function HIC=max $(t_1 - t_2)$ HPC, with $|t_2 - t_1| \leq 15$ ms is calculated and a maximum HIC value necessary for passing the test is determined.

Currently, the test is considered passed for HIC values of less than 1000, whereas already in the near future such a value could reduce to as low as 800 or 600. From the practical point of view, HIC values equal to such an order of magnitude can be obtained by realising a bonnet, on which the impact of the mock-up head takes place, which is as soft as possible.

However, this implies, apart from constructive problems, that the acceleration during the collision stays within limited values and, consequently, an extremely high deformation of the upper and inner surfaces of the bonnet (or of the protective portion normally present in contact with the outer surface) is obtained.

Moreover, a high deformation or squashing of the bonnet implies the need to foresee a substantial space between the lower surface of the bonnet and the motor housed in the relevant motor space. Such a drawback or the need to add protective material on the outer surface of the bonnet in any case impose stylistic and/or constructive restrictions which are not usually acceptable to automobile manufacturers.

FIG. 1 shows (reference CI) an ideal acceleration curve a (expressed in values of g), as time t varies, worked out mathematically in order to obtain a HIC value lower than the predetermined limit value (1000) and, at the same time, to limit the deformation of the surface of the bonnet (so as to minimise the distance between the aforementioned surface and the motor of the automobile). In reality, the tests conducted on a conventional bonnet show characteristic acceleration curves a (expressed in values of g) according to time t which are substantially discordant with respect to the ideal curve CI.

The same graph of FIG. 1 shows another two curves relative, respectively, to the case of a rigid (unyielding) bonnet, with a HIC value which is thus greater than 1000 (curve PC), and to the opposite case of a substantially yielding bonnet of an automobile (curve SC), the HIC value of which can really be less than 1000. Basically, conventional bonnets in reality have areas of different yield (one thinks, for example, of the more yielding central areas, with respect to the areas at attachments, side supports or hinges, which are more rigid) and this also contributes to increasing the difficulties of realising such structures, taking into account, in the same way, both the regulatory safety requirements and the design requirements.

In such requirements outlined previously, the purpose of the present invention is that of realising a bonnet structure for automobiles with improved safety characteristics, which allows the regulatory requirements concerning collisions with pedestrians and, in particular, those relative to head collisions to be met and, at the same time, which can be realised according to the desired design specifications.

Another purpose of the present invention is that of realising a bonnet structure for automobiles with improved safety characteristics, which allows the prevailing guidelines on the subject to be met uniformly in the various areas of its surface.

A further purpose of the invention is to realise a bonnet structure for automobiles with improved safety characteristics, which allows the guidelines regarding collisions with pedestrians to be met, without for this reason having to foresee great bulks in the bodywork and/or aesthetic profiles of the vehicle which are not pleasing to the eye.

The last but not least purpose of the invention is that of realising a bonnet structure for automobiles which is extremely robust, safe, functional and reliable.

These purposes, according to the present invention, are accomplished by realising a bonnet structure for automobiles with improved safety characteristics, according to claim 1, to which we refer for the sake of brevity.

Advantageously, in order to avoid characteristics of non-uniformity of the upper surface of the bonnet, according to the invention, it is foreseen to place an absorbency system between the upper surface and the lower-surface of the aforementioned bonnet, so that also at the side supports, attachments or hinges of the bonnet (which thus has a rigid underlying portion in those areas) a complete deformation is obtained ensured by the absorbency system. In this way, all of the bonnet structure yields uniformly in order to ensure the necessary safety characteristics in the case of a collision.

Further characteristics and advantages of a bonnet structure for automobiles with improved safety characteristics, according to the present invention, shall become clearer from the following description, given as an example and not for limiting purposes, referring to the attached schematic drawings, in which:

FIG. 6 shows an exploded section view of a further embodiment of the bonnet structure according to the present invention.

Figure 1:
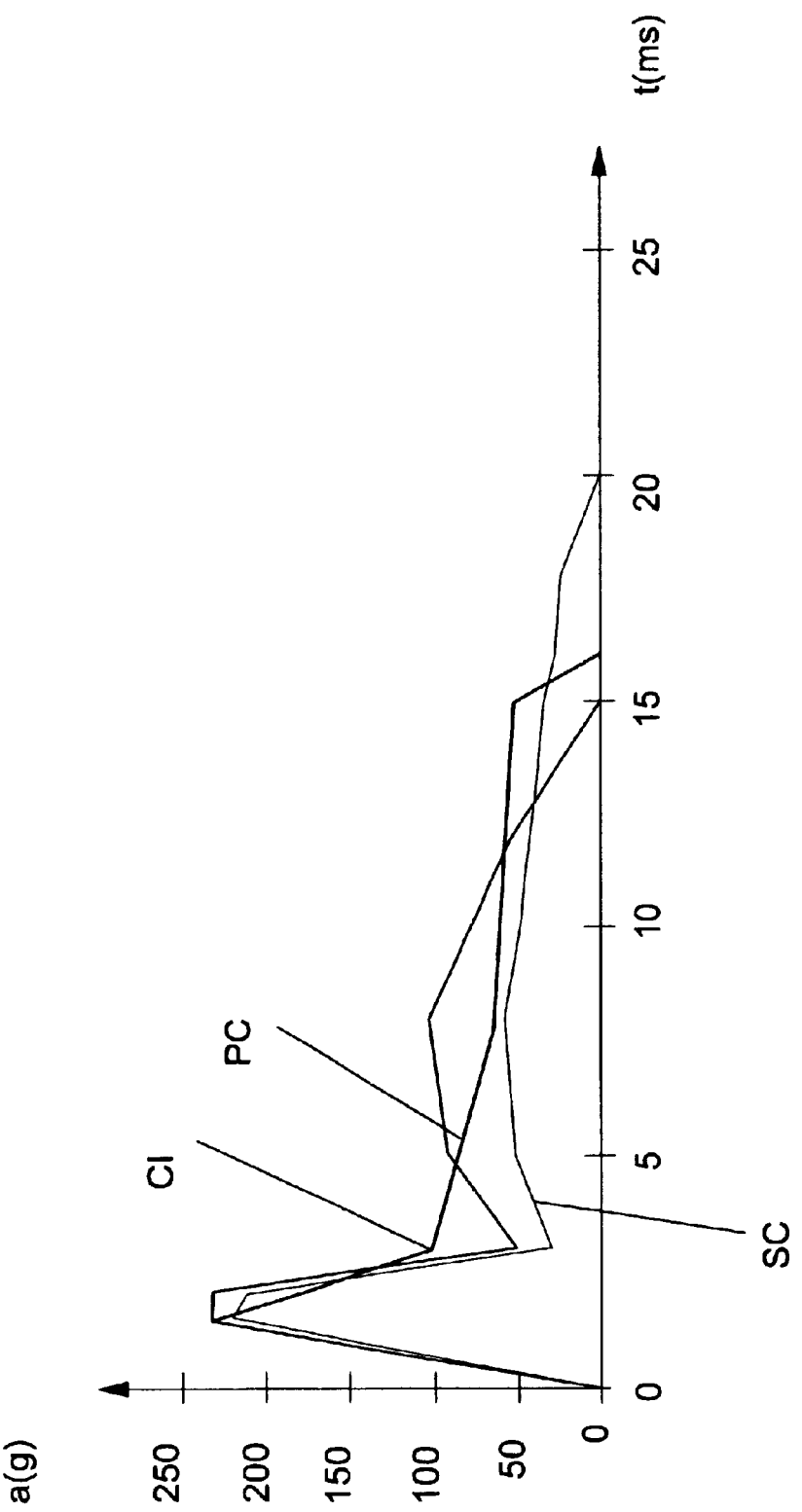
FIG. 1 is a Cartesian graph showing the progression through time of the acceleration curves in the case of a collision, for different bonnet structures.
Figure 2:
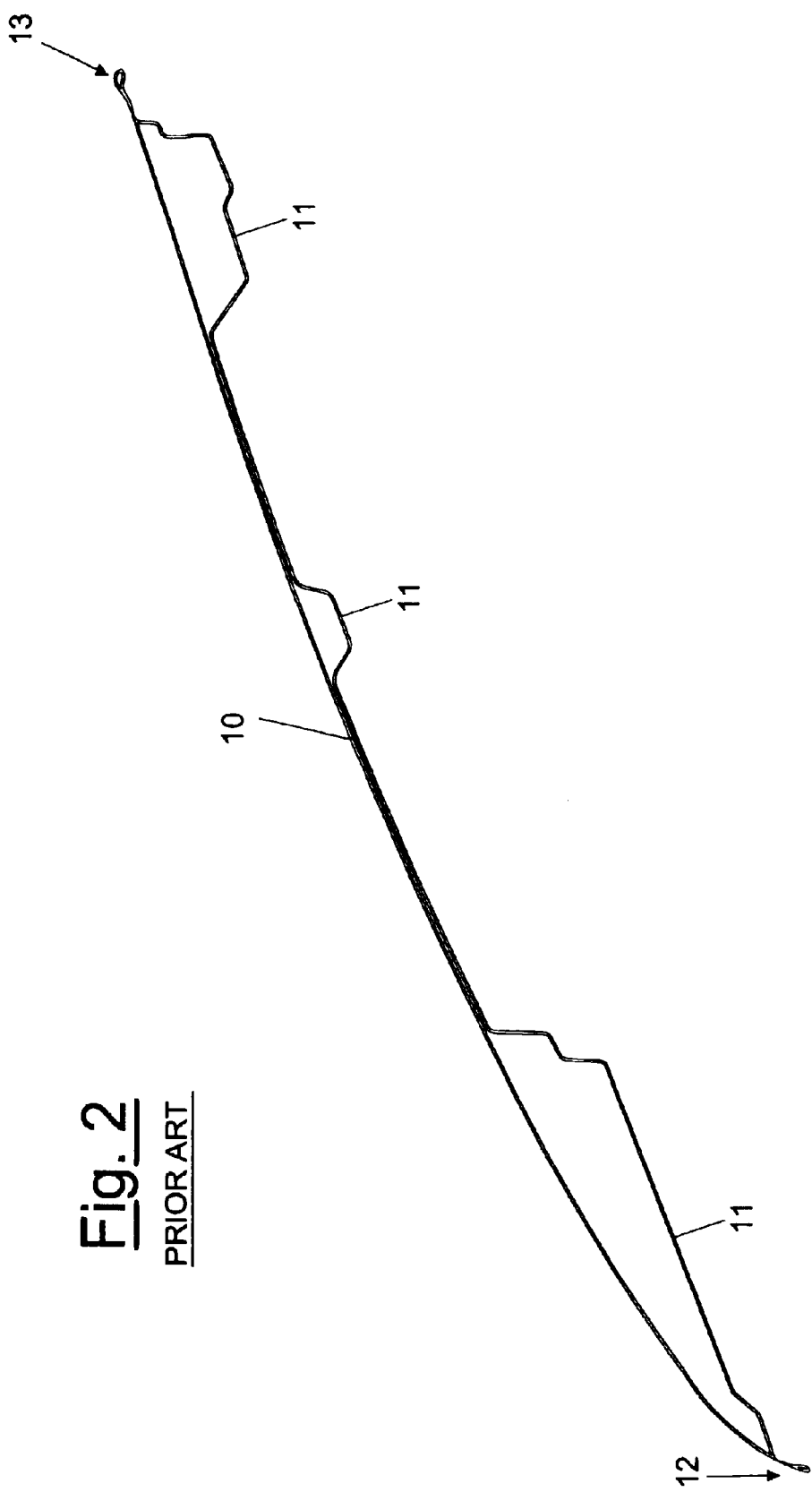
FIG. 2 shows a partial section view of a conventional bonnet structure.
Figure 3:
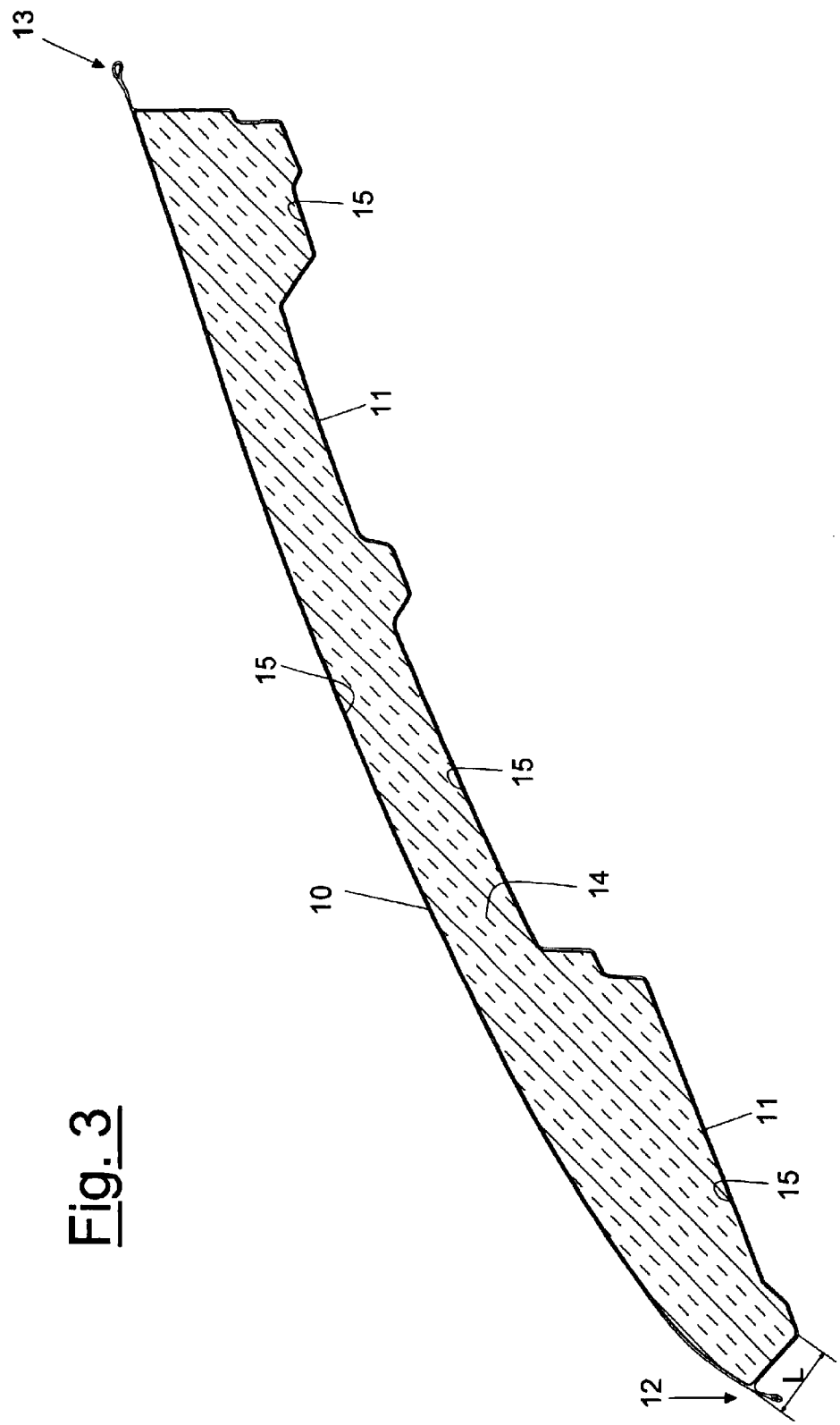
FIG. 3 shows a partial section view of a bonnet structure realised according to a preferred embodiment of the invention.
Figure 4:
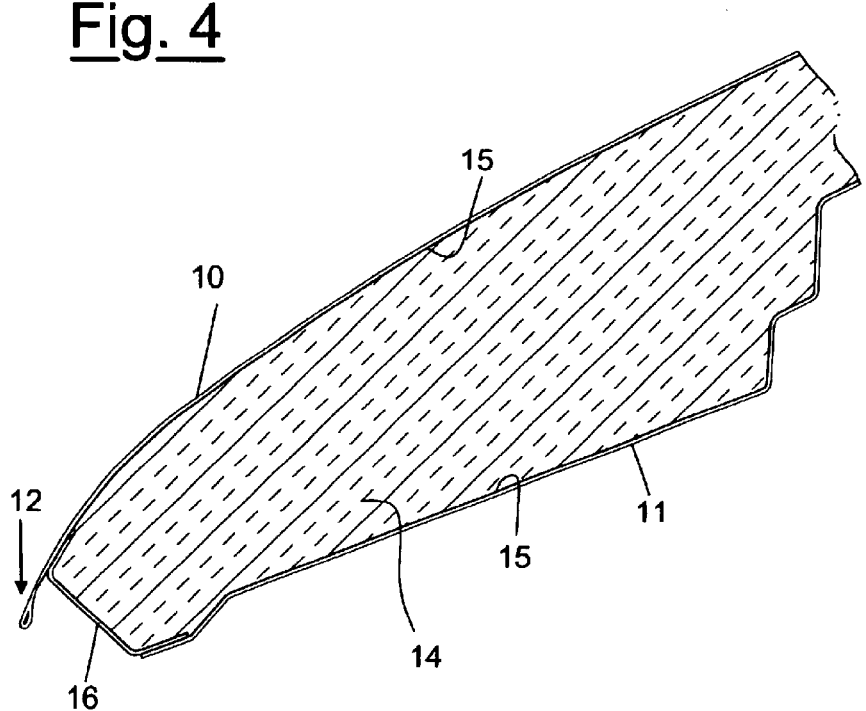
FIG. 4 is an enlarged view of a first portion of FIG. 3, according to a further preferred embodiment of the invention.
Figure 5:
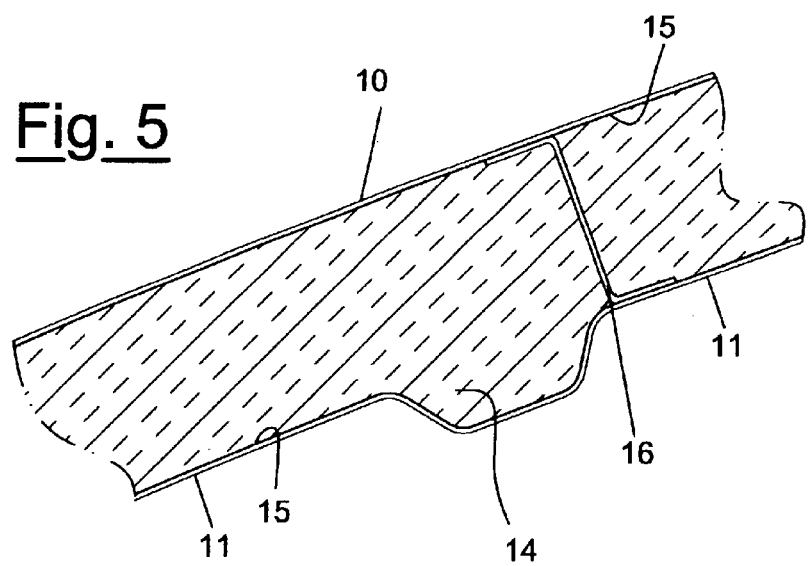
FIG. 5 is an enlarged view of a second portion of FIG. 3 and shows another possible embodiment of the bonnet structure according to the present invention.

With particular reference to FIGS. 2–6, which represent cross-sections of the vehicle bonnet, a first upper or outer surface of the aforementioned bonnet is indicated with 10, suitable for possibly being coated with a surface layer (varnished outer skin, decorative film or upper layer of varnished plastic material) having largely aesthetic functions, whereas a lower surface of such a bonnet structure is indicated with 11, variously shaped in order to be able to house the various apparatuses and components foreseen for the automobile in the motor space and to give bending rigidity to the bonnet itself.

In particular, the bonnet structure includes a first plate, which constitutes the outer surface 10 which is bent, at the ends 12, 13 to contain the shaped lower surface 11.

According to the present invention, at least one absorbency element 14, which allows adequate yield of the structure to be obtained, is placed between the upper surface 10 and the lower surface 11, so that the aforementioned structure is advantageously deformable, even at the side areas 12, 13 which usually rest upon rigid elements, such as attachments, side edges or hinges, during a collision which can take place between automobile and pedestrian.

The absorbency element 14 can consist of a single piece or a series of portions variously connected together. Moreover, the aforementioned element 14 can be made from expanded polypropylene, expanded polyurethane, aluminium foil honey comb or plastic, and in any case from any material which has adequate shock-absorbency characteristics.

By using a system of this type it is possible to obtain behaviour of the bonnet structure which is similar to that of ideal structures having an impact acceleration curve, according to time, like that represented by the curve CI of FIG. 1.

In particular, in order to improve the behaviour of the structure and to bring it ever closer to matching the characteristics of such an ideal curve CI, an outer surface 10 made from steel like $FePO_4$, with a thickness equal to about 0.7 mm, and one or more absorbency elements with an overall rigidity within the range 0.05 $N/mm^2$ and 0.2 $N/mm^2$, in particular, in the range 0.05 $N/mm^2$ and 0.1 $N/mm^2$ are normally used.

Moreover, it is foreseen to place such an absorbency system between an outer surface 10 and an inner surface 11 arranged at a minimum distance l of between 40 and 70 mm. In the case in which the outer surface 10 is made from aluminium plate or plastic it is possible to obtain, through the aforementioned structure, a low value (and thus less than the limit value equal to 1000 indicated by the prevailing safety directives) of the HIC parameter, with respect to the same structure coated with steel skin. In preferred but not limiting embodiments, the absorbency element 14 can be assembled between outer surface 10 and inner surface 11 through partial or total gluing. Regarding this, we refer in particular to FIGS. 4–7 where the layer of glue is locally indicated with reference numeral 15.

It should be noted on this point that a gluing method so extremely simple to realise allows a sandwich-type panel to be obtained which, overall, has excellent bending behaviour.

The structure thus realised, however, could present some problems, in particular from the local point of view. To be specific, it has been noted that such an absorbency element 14 could collapse longitudinally following a collision which has the consequence of consistently separating the outer and inner surfaces 10 and 11 apart. In order to also avoid this drawback, keeping the desired characteristics of yield and deformation during the collision with a pedestrian of the entire structure, it is possible to join, for example through gluing, a sheet 16, made from fabric, non-woven fabric or another material which has high resistance to traction and zero or almost zero bending moment to the absorbency element 14 (we refer directly to FIG. 5 for a quick comparison of the position of such a material 16).

In such a way, the local resistance to breaking is further improved, without worsening the characteristics of rigidity of the absorbency element 14.

The material 16 can also be positioned on the whole outer perimeter of the absorbency element 14, so as to connect the surfaces 10, 11 more tightly and to thus improve the local resistance to pulling apart.

Such a material 16 can also be inserted inside the absorbency element 14, and not just laterally, so as to improve the resistance to breaking of the absorber itself during a collision which takes place on the bonnet (such an embodiment is illustrated in detail in FIG. 6).

As an alternative to the gluing procedure of the element 14 on the surfaces 10, 11, further systems, for example of the mechanical type, can finally be foreseen, according to which the sheet of fabric 16 can be riveted to the ends of the upper surface 10 and of the lower surface 11. In any case, the gluing procedure has the advantage of preserving the outer aesthetics of the upper surface 10 of the bonnet.

According to a further embodiment of the structure according to the invention, the sheets of fabric 16 can finally be co-moulded with the absorber 14 or glued at predetermined areas thereof, before carrying out the final assembly of the structure, so as to make the production and the entire treatment easier.

From the description which has been made the characteristics of the bonnet structure for automobiles with improved safety characteristics, object of the present invention, are clear, just as the advantages are also clear.

Finally, it is clear that numerous other variants can be brought to the bonnet structure for automobiles in question, without for this reason departing from the novelty principles inherent to the inventive idea, just as it is clear that, in the practical embodiment of the invention, the materials, the shapes and the sizes of the illustrated details can be whatever according to requirements and they can be replaced with others which are technically equivalent.

What is claimed is:

1. Bonnet structure for automobiles with improved safety characteristics, in particular in the case of collisions in road accidents between automobiles and pedestrians, characterized in that it comprises at least one absorbency element (14), placed between an outer surface (10) and an inner surface (11) of said bonnet and having on at least one side of said absorbency element (14), a material (16) which has a strong resistance to traction and a zero or almost zero bending moment, said material (16) being arranged to firmly connect said outer and inner surfaces (10, 11) of the bonnet to improve local resistance to collapse of the absorbency element (14), said absorbency element (14) being positioned between the outer surface (10) and the inner surface (11) with a minimum distance (1) between said inner and outer surfaces of between 40 and 70 mm.

2. Bonnet structure for automobiles according to claim 1, characterized in that said absorbency element (14) is fixed to said outer and inner surfaces (10, 11) through gluing (15), carried out locally on at least one peripheral portion of said absorbency element (14), or through other mechanical connection means.

3. Bonnet structure for automobiles according to claim 1, characterized in that said outer surface (10) of the bonnet can be coated with a surface layer having aesthetic functions, whereas said inner surface (11) is variously shaped in order to be able to house, in a motor space, the various apparatuses and components foreseen for the automobile and to give rigidity.

4. Bonnet structure for automobiles according to claim 3, characterized in that said outer surface (10) consists of at least one sheet of steel plate, bent or folded at its ends (12, 13) for aesthetic and anti-injury reasons.

5. Bonnet structure for automobiles according to claim 1, characterized in that said absorbency element (14) is made from expanded polypropylene, expanded polyurethane, expanded polystyrene, or expanded products made with their alloys or copolymers of polypropylene, polystyrene or polyurethane, as aluminum foil or plastic honey comb, and in any case from in whatever materials which has adequate shock-absorbency characteristics.

6. Bonnet structure for automobiles according to claim 3, characterized in that said outer surface is made form steel of the $Fe-PO_4$ type, with a thickness equal to about 0.7 mm, and in that said absorbency element (14) has an overall rigidity within the range 0.05 $N/mm^2$ and 0.2 $N/mm^2$, in particular, in the range 0.05 $N/mm_2$ and 0.1 $N/mm_2$.

7. Bonnet structure for automobiles according to claim 3, characterized in that said outer surface (10) is made from aluminum plate or plastic.

8. Bonnet structure for automobiles according to claim 1, characterized in that said absorbency element (14) is joined, mechanically, physically or by gluing, to said material (16) made from a material which has high resistance to traction and zero or almost zero bending moment, in order to keep the desired characteristics of yield and deformation during the collision of the entire structure and to further improve local resistance to collapse, without worsening the characteristics of rigidity of the absorbency element (14).

9. Bonnet structure for automobiles according to claim 8, characterized in that said material (16) is made from fabric or non-woven fabric and can be positioned on the whole outer perimeter of the absorbency element (14), so as to connect said outer (10) and inner surfaces (11) of the bonnet more firmly and to thus improve local resistance to pulling apart.

10. Bonnet structure for automobiles according to claim 8, characterized in that said material (16) can be inserted inside said absorbency element (14), so as to improve the resistance to collapse of said absorbency element (14) during the collision, said material (16) also being able to be co-molded together with the absorbency element (14) before carrying out the final assembly of the bonnet structure.

11. Bonnet structure for automobiles with improved safety characteristics, in particular in the case of collisions in road accidents between automobiles and pedestrians, characterized in that it comprises at least one absorbency element (14), placed between an outer surface (10) and an inner surface (11) of said bonnet and having on at least one side of said absorbency element (14), a material (16) which has a strong resistance to traction and a zero or almost zero bending moment, said material (16) arranged to firmly connect said outer and inner surfaces (10, 11) of the bonnet to improve local resistance to longitudinal collapse of the absorbency element (14), said absorbency element (14) being positioned between the outer surface (10) and the inner surface (11) wit a minimum distance (1) between said inner and outer surfaces of between 40 and 70 mm.

* * * * *